United States Patent [19]

Kobashi et al.

[11] 3,910,643
[45] Oct. 7, 1975

[54] ANTI-SKID BRAKE CONTROL SYSTEM FOR A WHEELED VEHICLE

[75] Inventors: Uichiro Kobashi, Okazaki; Masami Inada, Toyoake; Katsuki Takayama, Chiryu, all of Japan

[73] Assignee: Aisin Seiki Kabushiki Kaisha, Kariya, Japan

[22] Filed: Feb. 21, 1973

[21] Appl. No.: 334,413

[30] Foreign Application Priority Data
Mar. 2, 1972 Japan.............................. 47-22014
Mar. 2, 1972 Japan.............................. 47-22015

[52] U.S. Cl............... 303/21 F; 60/580; 303/21 AF
[51] Int. Cl.............................................. B60t 8/12
[58] Field of Search.......... 303/21 F, 21 AF, 61–63, 303/68–69, 10; 188/181 A, 345; 60/551, 580, 581

[56] References Cited
UNITED STATES PATENTS

| | | | |
|---|---|---|---|
| 3,401,982 | 9/1968 | Walker et al...................... | 303/21 F |
| 3,606,488 | 9/1971 | Beuchle et al..................... | 303/21 F |
| 3,659,905 | 5/1972 | Goulish............................. | 303/21 F |
| 3,729,235 | 4/1973 | Bach et al......................... | 303/21 F |

Primary Examiner—Duane A. Reger
Assistant Examiner—D. C. Butler
Attorney, Agent, or Firm—Pierce, Scheffler & Parker

[57] ABSTRACT

An anti-skid brake control system including a power booster actuated by a hydraulic pressure source. The power booster comprises a valve movable by a brake pedal and first and second chambers separated by a power piston which is connected to a master cylinder. The two chambers have different effective areas and the arrangement being such that in normal brake operation, the first chamber communicates with the pressure source via the valve while the second chamber communicates with a reservoir and the power piston is actuated to apply the normal brake operation due to the pressure difference therebetween, and an anti-skid brake operation the second chamber also communicates with the pressure source via an electro magnetic valve actuated by a skid sensor, and thus, the brake pressure is decreased due to the pressure difference caused by the difference of the effective areas between the two chambers.

2 Claims, 2 Drawing Figures

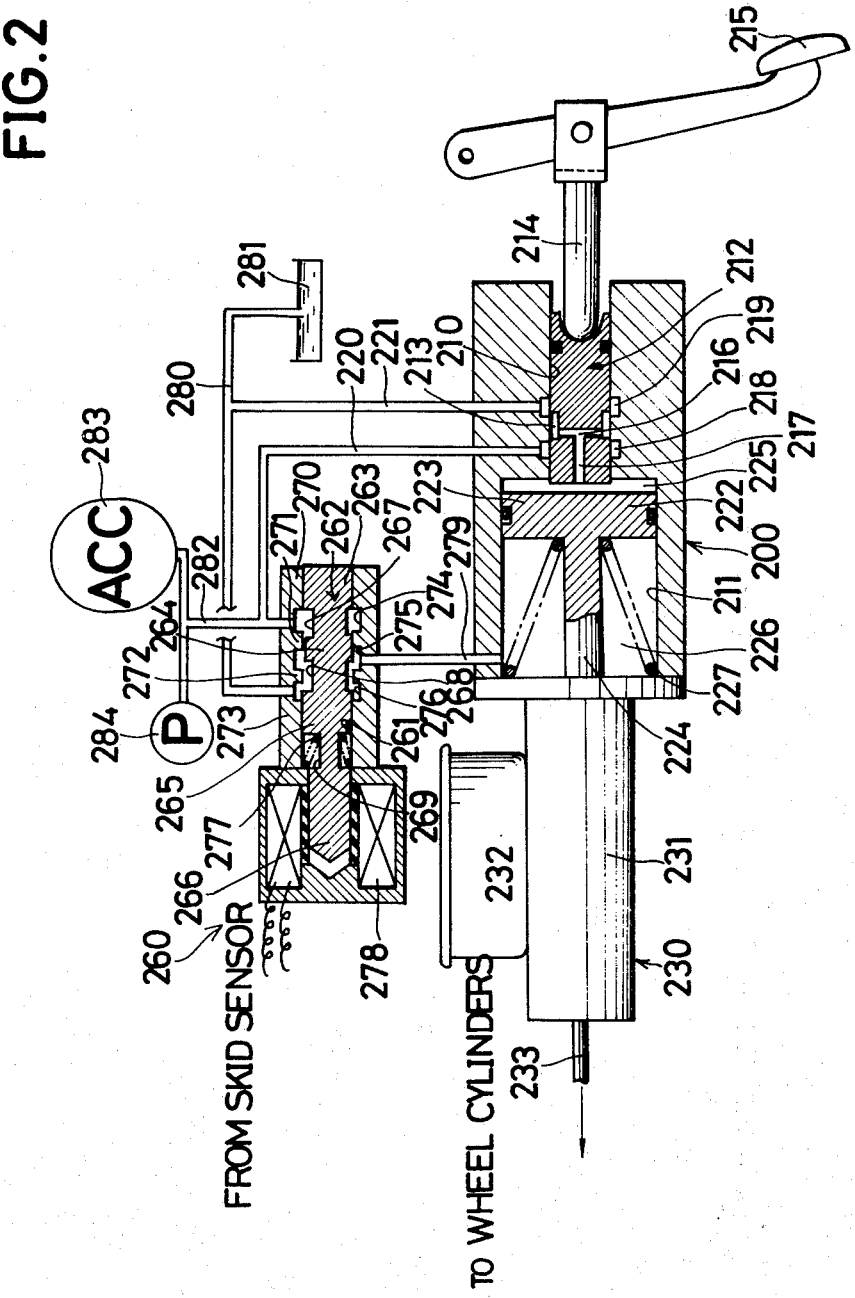

ANTI-SKID BRAKE CONTROL SYSTEM FOR A WHEELED VEHICLE

BACKGROUND OF THE INVENTION

This invention relates generally to anti-skid brake control systems, and more particularly to an anti-skid brake control system including a power booster.

In the conventional type of anti-skid brake control system, there is provided a valve means in a hydraulic brake circuit between the master cylinder and wheel brake cylinders adapted for on-off control of the fluid communication therebetween and said valve means is actuated by a skid sensor of known type. It takes much time and excessive force to respond immediately to said skid sensor by using the above mentioned valve means, to which a hydraulic brake pressure is opposingly actuated during brake operation.

Therefore, this conventional system should be modified on a large scale and the manufacturing cost accordingly increased, in order to obviate the above drawback.

SUMMARY OF THE INVENTION

It is an object of the invention to provide an improved anti-skid brake control system including a power booster for obviating the above conventional drawbacks.

It is another important object of the invention to provide an anti-skid brake control system for quickly responding to a wheel locking condition signal and for reliably releasing the brake pressure responsive to said signal.

It is a further object of the invention to provide a highly simplified and yet highly reliable anti-skid brake control system including a pump powered booster.

BRIEF DESCRIPTION OF THE DRAWINGS

These and further objects, features and advantages of the invention will become more apparent from the following detailed description of the invention and reference to the accompanying drawings illustrative of two preferred embodiments of the invention.

FIG. 1 is a longitudinal sectional view of a first embodiment of the invention wherein, however, several parts thereof are shown in a highly simplified form by way of blocks and the like.

FIG. 2 is a similar view to FIG. 1 wherein a second embodiment of the invention is illustrated.

DETAILED DESCRIPTION OF THE INVENTION

Figure 1:
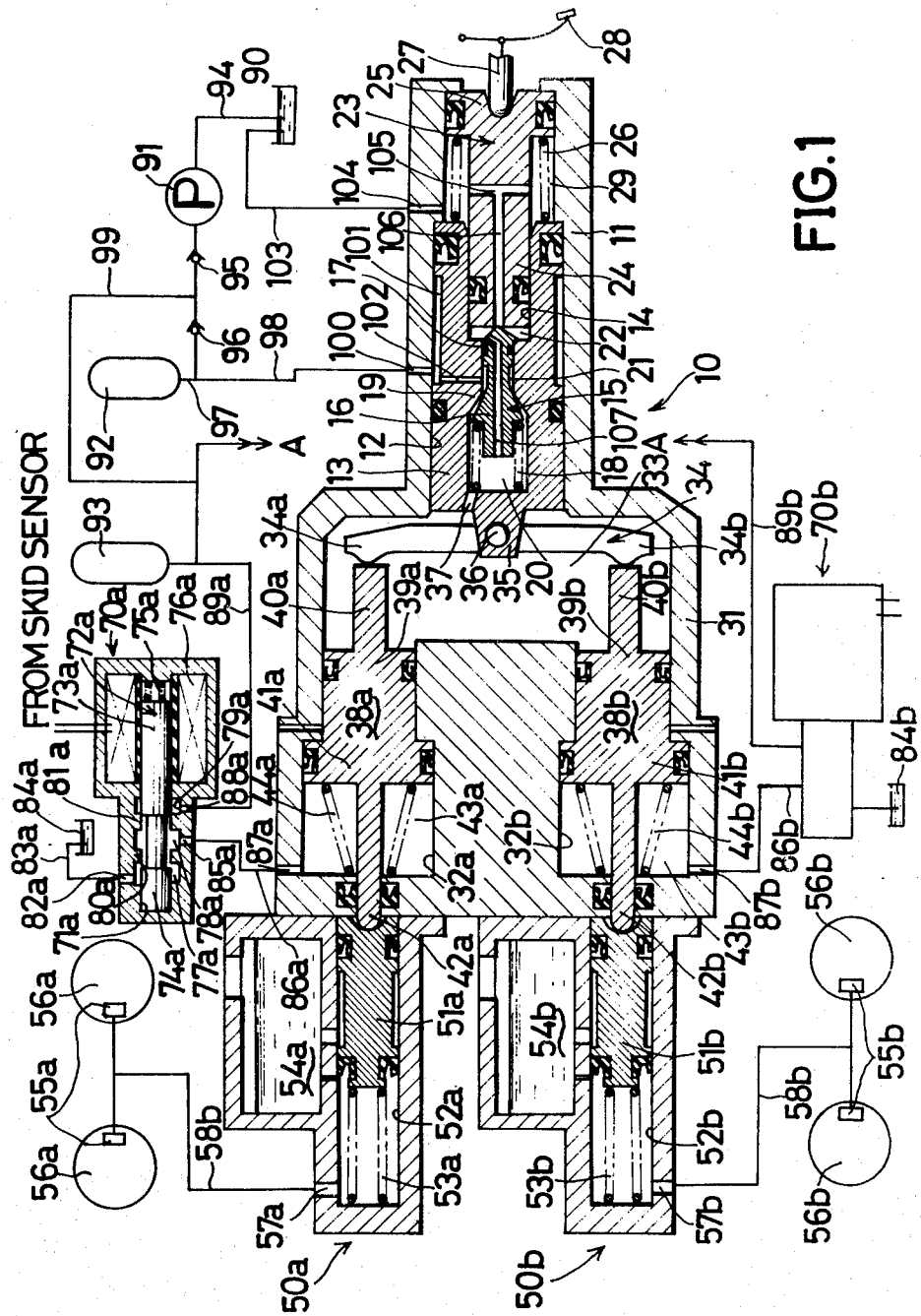

Referring now to the accompanying drawings, two preferred embodiments of the invention will be described hereinafter in detail.

In FIG. 1, the numeral 10 denotes generally a power booster housing having a large diameter portion 31 and a small diameter portion 11. The small diameter portion 11 of the housing 10 is formed with a stepped cylinder 12 in which an intermediate piston 13 and a transmitting piston 23 are slidably mounted. The intermediate piston 13 is formed axially with a stepped central bore 14 having a first recessed portion 20 a second recessed portion 21 and a third recessed portion 22 in turn from the left in FIG. 1. A valve body 15 is disposed in the central bore 14 of the intermediate piston 13. A spring 18 is also disposed in the first recess 20 of the bore 14 and normally biases the valve body 15 in a rightward direction as shown in FIG. 1. The valve body 15 is formed with a conical land portion 16 in the first recess 20 of the bore 14 and a head portion 17, in the second recess 21 of the bore 14. The portion 16 normally contacts a valve seat 19 formed on the inside wall of the piston 13 by the biasing force of the spring 18 and interrupts communication between the recesses 20, 21 while the portion 17 is slidably movable within the second recess 21 and usually interrupts communication between the second recess 21 and the third recess 22. In the right side portion 22 of the bore 14 there is slidably mounted a small diameter portion 24 of the transmitting piston 23 and a large diameter portion 25 of the piston 23 operatively connected to a brake pedal 28 via a rod 27.

A spring 26 is disposed in a small diameter portion of the stepped cylinder 12 between the intermediate piston 13 and the large diameter portion 25 of the transmitting piston 23 and normally biases the piston 13 in a leftward direction in FIG. 1.

The large diameter portion 31 of the housing 10 has two parallelly disposed stepped cylinders 32a, 32b and one recess portion 33. A bell crank lever 34 is pivotally mounted on an extension 35 of the intermediate piston 13 by means of a pivot pin 36 within the recess portion 33. A pair of stepped power pistons 38a, 38b are disposed in the pair of stepped cylinders 32a, 32b, respectively. The power piston 38a is formed with a small diameter portion 39a and a rightward projection 40a thereof, and a large diameter portion 41a and a leftward projection 42a thereof. The rightward projection 40a normally contacts an upper end 34a of the crank lever 34, while the leftward projection 42a operatively engages a piston 51a of a master cylinder unit 50a as later described. A chamber 43a is formed between the power piston 38a and the left end wall of the large diameter portion 31 and a spring 44a is disposed within the chamber 43a for biasing the power piston 38a in the rightward direction in FIG. 1. The master cylinder unit 50a is connected to the left side wall of the large diameter portion 31 of the power booster housing 10 and comprises a cylinder 52a, a reservoir 54a and the piston 51a. This piston 51a is operatively engaged with the leftward projection 42a of the power piston 38a and is slidably mounted in the cylinder 52a. A spring 53a normally biases the piston 51a in the rightward direction. It is noted that this master cylinder unit 50a is a conventional type and therefore detailed descriptions thereof have been omitted.

A hydraulic brake pressure generated in this master cylinder unit 50a is communicated to wheel brake cylinders 55a via a port 57a of the cylinder 52a and a conduit 58a.

The numeral 70a denotes generally an electromagnetic valve assembly having a cylinder 71a in which a plunger valve 72a is slidably disposed. The plunger valve 72a is formed of first and second lands 73a, 74a. A spring 75a, which is also disposed within the cylinder 71a, biases the plunger valve 72a in a leftward direction. The numeral 76a denotes a solenoid coil which is electrically connected to a skid sensor, not shown, via a computer, also not shown. The cylinder 71a is formed with three grooves 77a, 78a and 79a and two lands 80a and 81a. The first groove 77a communicates with a reservoir 84a via a port 82a of the cylinder 71a and a conduit 83a, the second groove 78a communicates with the chamber 43a of the power booster housing 10 via a port 85a of the cylinder 71a, a conduit 86a and a port 87a in the large diameter portion 31 of the power booster housing 10 and the third groove 79a communicates with an accumulator 93 via a port 88a of the cylinder 71a and a conduit 89a.

A reservoir 90 communicates with a pump 91 via a conduit 94 and a fluid pressure generated by the pump 91 is communicated on one hand with the electromagnetic valve assembly 70a via a check valve 95, conduits 99, 89a, the port 88a and the third groove 79a of the cylinder 71a and on the other hand, with the power booster housing 10, via check valves 95, 96, a conduit 98 and a port 100 of the small diameter portion 11 of the housing 10. An accumulator 92 also communicates with the port 100 via conduits 97, 98 and fluid pressure from the pump 91 is therein when it is not directed to the power booster. The port 100 is communicated with the second recess 21 of the central bore 14 via an annual groove 101 and a lateral passage 102 provided in the intermediate piston 13. The reservoir 90 also communicates with the power booster housing 10 via a conduit 103 and a port 104 in the small diameter portion 11. The port 104 further communicates with the recess portion 33 of the large diameter portion 31 via the small diameter portion 29 of the cylinder 12, passages 105, 106 which are provided in the small diameter portion 24 of the transmitting piston 23, the third recess 22 of the central bore 14, a penetrating bore 107 in the valve body 15, the first recess 20 of the central bore 14, a passage 37 which is provided at the left end of the intermediate piston 13.

Now, the reference numerals with appendix *b* as shown in FIG. 1 indicate elements in which the constructions and operations are the same as the corresponding elements indicated by numerals with appendix *a* and therefore are not further described. The operation of the first embodiment is as follows:

Assuming the driver of the vehicle exerts foot pressure upon the brake pedal 28, the transmitting piston 23 is moved to the left and the valve body 15 is disengaged from the valve seat 19 against the biasing force of the spring 18, simultaneously interrupting communication between the recesses 20 and 22 so that pressurized fluid from the pump 91 now flows into the recess portion 33 via passages 100, 102, 21, 20, 37. The power piston 38a is moved to the left against the biasing force of the spring 44a due to the pressure difference between the recess 33 and the chamber 43a which is connected to the reservoir 84a via electromagnetic valve assembly 70a and the piston 51a of the master cylinder assembly 50a is actuated by the power piston 38a and brake pressure is generated therein and transmitted to the wheel brake cylinders 55a to maintain a normal brake operation.

Assume now that a skid condition occurs at one of the wheels 56a during the above normal brake operation, then the skid sensor senses such condition and in response thereto the computer provides an electric signal to the solenoid coil 76a of the electromagnetic valve assembly 70a to actuate same. The plunger valve 72a of the assembly 70a now moves to the right against the biasing force of the spring 75a and this rightward movement of the plunger valve 72a changes the hydraulic communications of three groves 77a, 78a and 79a of the cylinder 71a. The second groove 78a which connects the chamber 43a of the power booster 10 with the reservoir 84a via the first groove 77a, is now interrupted and connects the chamber 43a with the hydraulic pressure source 91 via the third groove 79a.

Therefore the chamber 43a of the power booster 10 now communicates with the pressurized fluid from the pressure source 91 via the electro-magnetic valve assembly 70a.

As the difference of the cross-sectional areas between the large diameter portion 41a and the small diameter portion 39a of the power piston 38a also influences the effective areas of the chamber 43a and the recess portion 33 separated by the power piston 38a, the power piston 38a is moved to the right, as shown in FIG. 1, due to the pressure difference caused by the different effective area of the chamber 43a and the recess portion 33. This reverse movement of the power piston 38a decreases the brake pressure in the master cylinder 50a to a degree that the wheel skidding will be released. When the skid condition is overcome, the computer stops generating the electric signal responsive to the sensor. By repeating these operations in an extremely short period of time, the anti-skid brake operation can be obtained without cutting off the main brake circuit between the master cylinder and wheel brake cylinders.

In the event that there is no hydraulic pressure in the recess portion 33 due to leakage, then the transmitting piston 23 is moved to the left to contact the left side end wall of the third recess 22 of the bore 14 and is further moved to the left in unison with the intermediate piston 13. Therefore, the power piston 38a operatively connected to said intermediate piston 13 can be also moved to the left against the biasing force of the spring 43a to actuate the piston 51a of the master cylinder 50a. Thus should hydraulic pressure fail, the vehicle can be braked by manual piston means provided in the power booster housing 10.

Referring now to the second embodiment of the invention in FIG. 2. The numeral 200 denotes a power booster housing which is disposed between a brake pedal 215 and a master cylinder assembly 230. The power booster housing 200 is fluidically connected to an electro-magnetic valve assembly 260, fluid pressure source 284 and a reservoir 281.

The fluid pressure source 284 is connected to the reservoir via a connection not shown. The power booster housing 200 is provided with a stepped cylinder 210, 211 therein and a power piston 222 is slidably mounted in the large diameter portion 211 while a control piston 212 is slidably mounted in the small diameter portion 210. The end of the control piston 212 is engaged with a connecting rod 214 which is connected to the brake pedal 215. The small diameter portion 210 communicates with the reservoir 281 via an annular groove 219, conduits 221 and 280, and also communicates with the fluid pressure source 284 and an accumulator 283 via an annular groove 218, conduits 220 and 282. An annular groove 213 provided in the control piston 212 normally communicates via the groove 219 with the reservoir 281, as shown in FIG. 2, and with channels 216 and 217, provided within the control piston 212, and thence with a chamber 225 described hereinafter.

The power piston 222 divides the large diameter portion 211 into two chambers 225, 226. The chamber 225 communicates with the channel 217 of the control piston 212, while the chamber 226 communicates with the electro-magnetic valve assembly 260 via a conduit 279. The power piston 222 has a large diameter portion 223 opposed to the left end of the control piston 212 and a small diameter portion 224 operatively connected to the master cylinder assembly 230.

A spring 227 is disposed within the chamber 226 and biases the power piston 222 in a rightward direction. The master cylinder assembly 230 comprises a master cylinder 231, a reservoir 232 and a conduit 233 which leads to the wheel brake cylinders, not shown. The small diameter portion 224 of the power piston 222 is operatively connected to a piston in the master cylinder 231. This master cylinder piston is not shown in this embodiment but similar to that shown in the first embodiment illustrated in FIG. 1.

The electro-magnetic valve assembly 260 is provided with a cylinder 261 in which a plunger valve 262 is slidably disposed. This plunger valve 262 is provided with four lands 263, 264, 265 and 266 and three grooves 267, 268 and 269. The cylinder 261 is also provided with four lands 270, 271, 272 and 273 and three grooves 274, 275 and 276. A spring 277 is disposed within the cylinder 261 between the groove 269 of the plunger valve 262 and the land 273 of the cylinder 261 and biases the plunger valve 262 in a rightward direction. The electro-magnetic valve assembly 260 further comprises a solenoid coil 278 which is electrically connected to a skid sensor, not shown, via a computer means, also not shown.

In normal condition, that is, when the solenoid coil 278 is not actuated, the groove 275 of the cylinder 261 connects the chamber 226 of the power booster 200 with the reservoir 281 via the conduit 280, the groove 276 of the cylinder 261, and the conduit 279, while the groove 274 of the cylinder is connected with the fluid pressure source via the conduit 282. The communication between the grooves 275 and 274 is closed by the land 264 of the plunger valve 262 and the land 271 of the cylinder 261. In this position, therefore, both chambers 225 and 226 in the power booster 200 are connected with the reservoir 281 and accordingly, have no fluid pressure therein.

Assuming the driver of the vehicle exerts foot pressure upon the brake pedal 215, the control piston 212, which is operatively connected thereto, is moved to the left to interrupt communication between the annular groove 219 and the groove 213 and simultaneously to establish communication between the latter and the groove 218. Therefore, a pressurized fluid from the fluid pressure source 284 now flows into the chamber 225 via the grooves 213, and channels 216 and 217. The power piston 222 is then moved to the left due to the pressure difference in the two chambers 225 and 226. A brake pressure is generated in the master cylinder 230 due to the movement of the power piston 222 and transmitted to the wheel brake cylinders, and thus a normal brake operation can be maintained.

Assume now that a skid condition occurs at one of the wheels, not shown, during the above brake operation, the solenoid coil 278 of the elctro-magnetic valve assembly 260 is actuated by a computor means, not shown. The plunger valve 262 of the assembly 260 is moved to the left against the biasing force of the spring 277, due to the actuation of the solenoid coil 278. And now the communication between the reservoir 281 and the chamber 226 is interrupted by the lands 272, 264 and the groove 275 connects the chamber 226 with the fluid pressure source 284. Both the chambers 225, 226 of the power booster 200 are now connected with the fluid pressure source 284. The effective areas of the two chambers 225, 226 are different because the power piston 222 has a small diameter portion 224 defines the chamber 226 and a large diameter portion 223 defines the chamber 225. Therefore, due to the difference of the effective areas of the two chambers 225, 226, the power piston 222 is moved to the right, as is shown in FIG. 2. This backward movement of the power piston 222 decreases the brake pressure in the master cylinder 230 to release the skid condition and then the computer means stops generating the skid signal. These operations can be repeated to obtain the anti-skid brake operation without cutting off the main brake circuit between the master cylinder and the wheel brake cylinders.

In the event that there is no hydraulic pressure in the chamber 225 due to leakage, then the valve body 212 is further moved to the left by the operation of the brake pedal 215, to contact with the large diameter portion 223 of the power piston 222. Thus the power piston 222 can be moved to the left against the biasing force of the spring 227 to actuate the master cylinder 230.

From the above description, this invention enables the provision of a compact system which operates quickly and effectively to apply the brakes and also release same when a skid condition occurs.

What is claimed is:

1. An anti-skid brake control system for a wheeled vehicle having a manually operable brake pedal, a master cylinder and wheel brake cylinders hydraulically connected to said master cylinder, comprising;
   a booster disposed between said brake pedal and said master cylinder,
   a hydraulic pressure source supplying pressure to said booster for increasing the brake force applied to said master cylinder,
   a reservoir hydraulically connected to said hydraulic pressure source,
   means for generating a signal in response to a wheel locking condition, and
   an electromagnetic valve means actuated by said signal for connecting said booster selectively with said reservoir and said hydraulic pressure source,
   said booster including,
   a valve means movable by said brake pedal and being connected selectively with said reservoir and said hydraulic pressure source,
   a power piston means operably connected to said master cylinder and defining first and second chambers having different effective areas,
   said first chamber communicating with said valve means, and said second chamber communicating with said electromagnetic valve means, said second chamber having a larger effective area than said first chamber, and
   biasing means normally urging said power piston to the non-braking position,
   whereby, in normal brake operation said first chamber is connected to said hydraulic pressure source and said second chamber is connected to said reservoir to actuate said power piston means, and in anti-skid brake operation, said second chamber is also connected to said hydraulic pressure source via said electromagnetic valve means whereby the higher pressure in said second chamber having the larger effective area and said biasing means actuates said power piston to decrease the brake force.

2. An anti-skid brake control system as set forth in claim 1, wherein said booster further comprises a manual piston means operatively connected to said brake pedal, said manual piston means being in unison with said power piston means to actuate same in case of pressure leakage in said hydraulic pressure source.

* * * * *